(12) United States Patent
Lopez et al.

(10) Patent No.: US 10,574,178 B2
(45) Date of Patent: Feb. 25, 2020

(54) PHOTOVOLTAIC ELEMENTS INCLUDING DRAINAGE ELEMENTS

(71) Applicant: DOW GLOBAL TECHNOLOGIES LLC, Midland, MI (US)

(72) Inventors: Leonardo C. Lopez, Midland, MI (US); Susan M. Zerull, Midland, MI (US); James J. O'Brien, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/768,796

(22) PCT Filed: Oct. 13, 2016

(86) PCT No.: PCT/US2016/056794
§ 371 (c)(1),
(2) Date: Apr. 16, 2018

(87) PCT Pub. No.: WO2017/069998
PCT Pub. Date: Apr. 27, 2017

(65) Prior Publication Data
US 2019/0058437 A1 Feb. 21, 2019

Related U.S. Application Data

(60) Provisional application No. 62/243,294, filed on Oct. 19, 2015.

(51) Int. Cl.
*H02S 20/25* (2014.01)
*E04D 1/12* (2006.01)
*E04D 1/34* (2006.01)

(52) U.S. Cl.
CPC .............. *H02S 20/25* (2014.12); *E04D 1/12* (2013.01); *E04D 2001/3423* (2013.01); *E04D 2001/3458* (2013.01)

(58) Field of Classification Search
CPC ... H02S 20/25; E04D 1/12; E04D 2001/3423; E04D 2001/3458; Y02B 10/12
See application file for complete search history.

(56) References Cited

U.S. PATENT DOCUMENTS

| 1,894,614 A | * | 1/1933 | Wettlaufer | E04D 1/26 52/553 |
| 2,132,209 A | * | 10/1938 | Greenlee | E04D 1/26 52/13 |

(Continued)

FOREIGN PATENT DOCUMENTS

| DE | 102008022157 A1 | * | 11/2008 | ............... E01C 5/20 |
| JP | 2000265623 A | | 9/2000 | |

OTHER PUBLICATIONS

PCT International Search Report, PCT Application No. PCT/US2016/056794 dated Jan. 5, 2017, 3 pages.

*Primary Examiner* — Adriana Figueroa (57) ABSTRACT

A photovoltaic element comprising: (a) a photovoltaic assembly; (b) a shingle portion connected to the photovoltaic assembly, the shingle portion including: (i) one or more flexible regions and (ii) one or more attachment regions; wherein the one or more attachment regions connect the photovoltaic element to a structure and the one or more flexible regions are flexed so that all or a portion of the attachment regions are located below the shingle portion; and wherein the one or more flexible regions, the one or more attachment regions, or both include one more drainage elements.

9 Claims, 3 Drawing Sheets

(56) References Cited

U.S. PATENT DOCUMENTS

| | | | | |
|---|---|---|---|---|
| 2,253,753 | A * | 8/1941 | Black | E04D 1/34 |
| | | | | 52/518 |
| 2,403,318 | A * | 7/1946 | Weseman | E04F 13/0864 |
| | | | | 52/302.1 |
| 4,672,790 | A * | 6/1987 | Freiborg | E04D 1/26 |
| | | | | 52/521 |
| 4,967,521 | A | 11/1990 | Pike | |
| 5,293,727 | A * | 3/1994 | Yoshimoto | E04D 1/265 |
| | | | | 52/533 |
| 6,360,497 | B1 * | 3/2002 | Nakazima | E04D 1/24 |
| | | | | 126/622 |
| 6,489,552 | B2 * | 12/2002 | Yamawaki | E04D 1/30 |
| | | | | 136/251 |
| 8,943,766 | B2 * | 2/2015 | Gombarick, Jr. | H02S 20/23 |
| | | | | 52/173.3 |
| 2010/0051084 | A1 * | 3/2010 | Nocito | E04F 10/06 |
| | | | | 136/244 |
| 2011/0030761 | A1 * | 2/2011 | Kalkanoglu | E04D 5/12 |
| | | | | 136/245 |
| 2011/0283630 | A1 | 11/2011 | Beckham et al. | |
| 2013/0055664 | A1 | 3/2013 | Gombarick et al. | |
| 2015/0155822 | A1 * | 6/2015 | Feng | H01L 31/03926 |
| | | | | 136/259 |

\* cited by examiner

PHOTOVOLTAIC ELEMENTS INCLUDING DRAINAGE ELEMENTS

CROSS-REFERENCE TO RELATED APPLICATION

The present application is a U.S. National Stage entry under 35 U.S.C. § 371 of International Application No. PCT/US2016/056794, filed Oct. 13, 2016, which claims the benefit of U.S. Provisional Application No. 62/243,294, filed Oct. 19, 2015, the disclosures of which are incorporated by reference herein in the entireties and for all purposes.

FIELD

The present teachings generally relate to an improved photovoltaic element including structures to prevent wind driven rain from penetrating the photovoltaic array and to facilitate in removal of fluids from the photovoltaic array that may penetrate into the photovoltaic array.

BACKGROUND

Typically, photovoltaic arrays are placed in an elevated location such as a roof top of a home or a building or in a rack and frame that elevates the photovoltaic array so that the photovoltaic array is exposed to sunlight. The roofs on homes and/or buildings generally are formed by adding a plurality of pieces of panels together so that a generally contiguous surface is formed, which are supported by one or more trusses. Photovoltaic elements may be secured to the plurality of pieces of panels directly and/or indirectly via a connection structure such as a rack and frame. Each photovoltaic element of the photovoltaic array may include only an active portion and the active portions of two or more photovoltaic elements may be placed in close proximity with one another so that a photovoltaic array is formed over and/or on the connection structure. However, in cases where the photovoltaic elements provide roofing functions, the photovoltaic elements may include both an active portion and a support portion and the active portion of one photovoltaic element may fully and/or partially cover the support portion of an adjacent photovoltaic element to replace the framing and racking structure. Further, the active portion and the support portion are one integrally formed piece with the photovoltaic active portion located within the active portion so that in order to remove the photovoltaic active portion the entire photovoltaic element would be removed and replaced if necessary. In cases of building integrated photovoltaics, the support portion may provide roofing functions or structural functions for subsequent photovoltaic elements. Structures may be applied between the two overlapped photovoltaic elements to prevent wind from being driven up the slope of the roof between the photovoltaic elements.

Examples of some photovoltaic elements and roofing materials may be found in U.S. Pat. Nos. 1,975,986; 4,226,069; 6,758,019; and 8,943,766; U.S. Patent Application Publication Nos. 2006/0201094; 2009/0159118; 2009/0133740; 2009/0320898; 2010/0051084; and 2013/0152996 all of which are incorporated by reference herein for all purposes.

It would be attractive to have a photovoltaic element that prevents rain from being driven into the photovoltaic array and permits fluid to escape from the photovoltaic array that may be introduced from other locations such as a side of a photovoltaic element. It would be attractive to have one or a plurality of weep holes or drainage features that allow for fluid to move through a structure and that prevents wind driven rain from entering the photovoltaic array. What is needed is a photovoltaic element with weep holes to allow fluid to pass between photovoltaic elements while preventing the fluid from extending under the photovoltaic array. What is needed is a photovoltaic element that includes both weep holes and drainage features that remove water from the photovoltaic array so that water does not become trapped within the photovoltaic elements and cause roof deck deterioration, mold growth, water leakage, or a combination thereof.

SUMMARY

The present teachings meet one or more of the present needs by providing: a photovoltaic element comprising: (a) a photovoltaic assembly; (b) a shingle portion connected to the photovoltaic assembly, the shingle portion including: (i) one or more flexible regions and (ii) one or more attachment regions; wherein the one or more attachment regions connect the photovoltaic element to a structure and the one or more flexible regions are flexed so that all or a portion of the attachment regions are located below the shingle portion; and wherein the one or more flexible regions, the one or more attachment regions, or both include one more drainage elements.

The present teachings provide: an assembly comprising: a plurality of photovoltaic elements comprising: (a) a photovoltaic assembly; (b) a shingle portion connected to the photovoltaic assembly, the shingle portion including: (i) one or more flexible regions and (ii) one or more attachment regions; wherein the one or more attachment regions connect the photovoltaic element to a structure and the one or more flexible regions are flexed so that all or a portion of the attachment regions are located below the shingle portion; and wherein the one or more flexible regions, the one or more attachment regions, or both include one more drainage elements, and some of the photovoltaic elements include an overlap region that is covered by one or more adjacent photovoltaic elements and the attachment region of the one or more adjacent photovoltaic elements are connected to the overlap region.

The teachings herein surprisingly solve one or more of these problems by providing a photovoltaic element that prevents rain from being driven into the photovoltaic array and permits fluid to escape from the photovoltaic array that may be introduced from other locations such as a side of a photovoltaic element. The present teachings provide one or a plurality of weep holes or drainage features that allow for fluid to move through a structure and that prevents wind driven rain from entering the photovoltaic array. The present teachings provide a photovoltaic element with weep holes to allow fluid to pass between photovoltaic elements while preventing the fluid from extending under the photovoltaic array. The present teachings provide a photovoltaic element that includes both weep holes and drainage features that remove water from the photovoltaic array so that water does not become trapped within the photovoltaic elements and cause roof deck deterioration, mold growth, water leakage, or a combination thereof.

DETAILED DESCRIPTION

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

A plurality of photovoltaic elements of the teachings herein are combined together to form a photovoltaic array. The photovoltaic array collects sunlight and converts the sunlight to electricity. Generally, each of the photovoltaic elements may be individually placed in a structure that houses all of the photovoltaic elements forming all or a portion of a photovoltaic array. The photovoltaic elements may be connected to one or more structures to attach the photovoltaic elements. The structures may be a rack, a roof structure, another photovoltaic element, or a combination thereof. The photovoltaic elements of the teachings herein may be used with a housing that contains all of the individual photovoltaic elements and make up a photovoltaic array. Preferably, the photovoltaic array taught herein is free of a separate structure that houses all of the photovoltaic elements that make up a photovoltaic array (also referred to as a solar array). More preferably, each individual photovoltaic element may be connected directly to a roof structure (i.e., is a building integrated photovoltaic (BIPV)) and each of the individual photovoltaic elements is electrically connected together so that a photovoltaic array is formed. Each individual photovoltaic element may include a shingle portion, interconnection wiring, and a photovoltaic assembly that are all discrete pieces and are connected together. The photovoltaic assembly may be embedded within the shingle portion so that the shingle portion protects the photovoltaic assembly. The shingle portion may include a support portion, an active portion, and an overlap region. Some of the shingle portions may include an overlap region that may not be overlapped by one or more adjacent photovoltaic elements. For example, a row located at the peak may include an overlap region but the overlap region may not be overlapped by one or more adjacent photovoltaic elements. Preferably, only the top row of photovoltaic elements is free of being overlapped by adjacent photovoltaic elements. The top row of photovoltaic elements may be overlapped by standard shingles. The active portion may overlap all or a portion of one or more adjacent photovoltaic elements (e.g., the overlap region) forming a "double overlap" so that each photovoltaic element may be protected and connected to a roof structure and/or so that the combined photovoltaic elements may form a shingle structure for diverting fluids from the roof of the structure. Each of the photovoltaic elements may have a portion that may be indirectly and/or directly connected to a roof structure. The shingle portion, the attachment region, or both may directly connect to a connection surface and the photovoltaic assembly may be connected to a support portion of the photovoltaic element (i.e., the photovoltaic assembly may be indirectly connected to the roof structure). Preferably, the overlap region of each of the photovoltaic elements may be directly connected to a roof structure, and the active portion may be connected directly to the overlap region or directly to the roof structure by a fastener that extends through the overlap region, around the overlap region, through a fastener support in the overlap region, or a combination thereof.

The photovoltaic element may function to generate electricity when a photovoltaic assembly is connected to the shingle portion. The photovoltaic assembly (e.g., part of the active portion) may be a portion of the photovoltaic element that is not covered by one or more adjacent photovoltaic elements. The photovoltaic element may be a combination of a shingle portion and a photovoltaic assembly. The photovoltaic element may include an inactive portion (i.e., a shingle portion) and an active portion (i.e., a photovoltaic assembly). The shingle portion may be directly connected to roof structure and the shingle portion may hold the photovoltaic assembly in place.

The shingle portion may function to provide support to one or more photovoltaic assemblies. The shingle portion may support one or more photovoltaic assemblies during transportation. The shingle portion may function to support the photovoltaic assembly when a load is applied to the photovoltaic assembly and the photovoltaic assembly is connected to a connection surface. For example, when the photovoltaic element is connected to a roof and a person walks across the photovoltaic array the shingle portion may resist bending of the photovoltaic assembly so that the photovoltaic assembly is not damaged. The shingle portion may function to provide support for one or more adjacent photovoltaic elements. The shingle portion of a first photovoltaic element may function to overlap one or more connectors, one or more shingle portions, one or more overlap regions, or a combination thereof of one or more second adjacent photovoltaic elements. The shingle portion of a first photovoltaic element may protect one or more connectors that are connected to and extend between two adjacent second photovoltaic elements. The shingle portion and the photovoltaic assembly may be connected. The shingle portion includes a top end (e.g., an end that is located towards a peak of a roof) and a bottom end (e.g., an end that is located down a roof relative to the top portion and the peak of the roof). The top end may include one or more top regions or top portions. The photovoltaic element, shingle portion, or both may include one or more bottom ends, one or more top ends, or both. Each transition region may include a top end and a bottom end and the top end of one region may be adjacent to or abut a bottom end of an adjacent region. For example, a bottom end of a shingle portion may be located proximate to a top end of a flexible region so that the flexible region and the shingle portion are connected. The shingle portion may include one or more bottom ends and preferably includes a plurality of bottom ends. For example, the flexible region may be integral to the shingle portion, however, each time the flexible regions are folded a new bottom end may be formed. Each flexible region has a bottom end and a top end. Each attachment region may have a bottom end and a top end. The bottom end and the top end of the flexible region and the attachment region may be a distinct termination point. Preferably, the attachment region is part of the flexible region and the bottom end and the top end of the flexible region and the attachment region are the same so that no distinct transition regions may be present. The attachment region may be a planar portion of the flexible regions. The top ends of the flexible regions, the attachment regions, or both may be located above a bottom end of the flexible regions, the attachment regions, or both so that the top ends are located above the bottom ends. The photovoltaic element may include a top end and a bottom end.

The top end is oriented above a bottom end so that water is moved down a slope and off of the photovoltaic array. The top portion, the bottom portion, or both may be substantially rigid and may assist in connecting the photovoltaic element to the roof structure. The top portion, the bottom portion, or both may include one or more flexible regions. The top portion, the bottom portion, or both may be folded upon itself to prevent fluid from being driven up a roof and into the photovoltaic array. The top portion, the bottom portion, or both may be connected directly to the roof structure. The top portion, the bottom portion, or both may overlap or receive a shingle portion (e.g., an inactive portion or insert portion) of one or more adjacent photovoltaic elements. A front region, front surface, or both may be located between a top end and a bottom end of the shingle portion.

The front region or front surface may function as the active portion. The front region or front surface may include the active portion, the photovoltaic assembly, or both. The front region or front surface may face upward (i.e., towards the sun) when the photovoltaic element is in the fully installed position. The front region or front surface may include the flexible region and may be folded so that a portion of the front region is located beneath the shingle portion. Preferably, the front region or front surface is the portion of the photovoltaic element that is exposed and not covered when the photovoltaic element is in the fully installed position. A portion of the front region or front surface may be covered by or incorporated into an adjacent photovoltaic device (e.g., an overlap region, a fold surface, an insert portion).

The insert portion may function to incorporate a portion of photovoltaic element into another photovoltaic element. The insert portion may be covered on a top, on a bottom, or both by an attachment region, a flexible region, or both. The insert portion may include one or more fold surfaces (i.e., a part of the insert portion that contacts the flexible region, the attachment region, or both). The insert portion may assist in forming a water tight interface. The insert portion may prevent water from being blown up the slope of the roof and between two or more photovoltaic elements. The insert portion may receive one or more fasteners. The insert portion may be connected to one or more pieces of attachment material in an attachment region, one or more flexible regions, or both. The insert portion may have a top end and the flexible region may be wrapped about the top end of the insert portion.

The shingle portion may function to provide roofing functions. All or a portion of the shingle portion may be rigid. The shingle portion may have rigid regions. For example, the shingle portion may be substantially rigid in the regions surrounding the photovoltaic assemblies. Preferably, the shingle portion includes one or more flexible regions.

The shingle portion may include one or more regions that may fold upon itself. The shingle portion may include one or more flexible regions. The shingle portion may include a plurality of flexible regions. Each of the flexible regions may be folded, bent, curved, arced, or a combination thereof. Each flexible region may result in one or more folds. Preferably, each flexible region is folded at least one time. Thus, if one flexible region is present then one fold is present. The flexible regions may be connected directly to the roof structure and then folded so that the shingle portion overlaps the flexible region. The flexible regions may be folded upon itself and then the shingle portion folded over multiple flexible regions. When more than one flexible region is present the flexible regions may form an undulating structure or a generally "S" shaped structure. When the one or more flexible regions (e.g., two or more flexible regions) are folded in an "S" shape, a portion of the shingle portion (e.g., an insert portion) may extend into the "S" and a front surface (i.e., a fold surface of an insert portion) may be in contact with the adjacent attachment region. When more than one flexible region is present one or more fasteners may extend through each flexible region individually or one or more fasteners may extend through all of the flexible regions. The flexible region may fold back upon itself so that the flexible region is about 180 degrees from another flexible region, a shingle portion, or both. The flexible region may be folded back upon itself, upon an attachment region, around another shingle portion, around an overlap region, or a combination thereof. The flexible region, the attachment region, or both may be folded about 60 degrees or more, about 90 degrees or more, about 120 degrees or more, about 145 degrees or more, about 160 degrees or more, or even about 180 degrees or more. The one or more folds may be a forward facing fold or a downward facing fold. The forward fold may have the front surface facing upward when the attachment region is folded. The downward facing fold may have the front surface facing downward when the attachment region is folded. The one or more folds may be folded about another photovoltaic element, a shingle portion, or a combination thereof. A fastener may extend through the one or more folds and the shingle portion to connect two or more photovoltaic elements to the roof structure at the same time. Preferably, the flexible region includes one or more attachment regions and the fasteners extend through the attachment regions. The attachment regions are a part of the flexible region that connects the shingle portion to another photovoltaic element, a roof structure, or both. The flexible region and the attachment region may be made of the same material. The one or more flexible regions may be folded according to the teachings herein including those of U.S. Pat. No. 8,943,766 Column 3, line 62 through Column 4, line 18 the teachings of which are expressly incorporated by reference herein for all purposes. Preferably the shingle portion includes one or more transverse flexible regions. For example, the transverse flexible regions may extend transverse to the slope of the roof (i.e., extend laterally along the roof). The transverse flexible regions may extends in a transverse direction of the shingle (e.g., width). The flexible regions may be a longitudinal flexible region and may be folded to prevent fluid from entering each photovoltaic element from a side. All of the sides may be folded and connected to the roofing structure or adjacent photovoltaic element to prevent ingress of water from water being blown in a transverse direction along a roof. The one or more flexible regions may include one or more drainage elements to remove any water that may penetrate the photovoltaic array or the photovoltaic elements.

The one or more drainage elements may function to allow egress of water from the photovoltaic array, a photovoltaic element or both. Preferably, the one or more drainage elements allow for water to exit and prevent water from entering a photovoltaic array, a photovoltaic element, or both. The one or more drainage elements may function to allow water to exit through the flexible regions, through a folded flexible region, extend around a flexible region, through an attachment region, around an attachment region, or a combination thereof. The one or more drainage elements may function to prevent a build-up of water or water from being collected within a photovoltaic array, a photovoltaic element, or both. The one or more drainage elements may assist in permitting air flow through the photovoltaic array, a photovoltaic element, or both. For example, The shingle portion, flexible region, folded flexible region, or a combination thereof may include a sufficient amount of drainage elements so that once all of the water is removed air can flow through the drainage elements to remove any remaining moisture. The one or more drainage elements preferably are a plurality of drainage elements. The one or more drainage elements may all be in one or more lines. The one or more drainage elements may all be located within a single plane. The one or more drainage elements may extend through a fold, a planar portion of the flexible region, or both. The one or more drainage elements may be randomly located within the flexible region, a fold in a flexible region, an attachment region, or a combination thereof. The one or more drainage elements may be located proximate to one or more fasteners or one or more fastener locations. The one or more drainage elements may be located next to one or more fasteners. The drainage elements and the fasteners may have an alternating relationship. The one or more drainage elements may extend partially or fully through an attachment region, a flexible region, a fold, or a combination thereof. The one or more drainage elements may extend in the direction of the slope of the roof. The one or more drainage elements may be a thinning of material in specific locations, holes, an absence of material, a channel, or a combination thereof. The one or more drainage elements may be weep holes, drainage features, or both.

The one or more weep holes may function to extend through an attachment region, a fold, or both so that water can exit a photovoltaic array, a photovoltaic element, or both. The one or more weep holes may function to create a folding location for the attachment region (e.g., a flexible region). The one or more weep holes may form a flexible region so that the attachment region of the shingle portion may be folded upon itself. The one or more weep holes may extend across a length, a width, or both of the photovoltaic element. The one or more weep holes may extend in a transverse direction forming a transverse flexible region. The one or more weep holes may extend in a straight line, be staggered relative to each other, or both. The one or more weep holes may be one or more rows or two or more rows of weep holes in a fold, a flexible region, an attachment region, or a combination thereof. The one or more weep holes may be sufficiently large so that fluid may pass therethrough and exit the photovoltaic array, a photovoltaic element, or both. The one or more weep holes may be sufficiently small so that fluid is prevented from being driven through the weep holes into the photovoltaic array, the photovoltaic elements, or both. The one or more weep holes may be substantially the same size as the weep holes extend from a front surface to a rear surface of the shingle portion, the attachment region, a fold, a flexible region, or a combination thereof. The one or more weep holes may change cross-sectional length (e.g., diameter) as the weep holes extend from a front surface to a rear surface of the shingle portion, the attachment region, a fold, a flexible region, or a combination thereof. For example, the diameter of the weep hole may be smaller at the front surface than the rear surface so that fluid is prevented from entering the photovoltaic element but the fluid is encouraged to exit through the weep hole (e.g., the weep hole may have a cone shape). The weep holes may have a shape that is substantially round, oval, square, rectangular, diamond, star, or a combination thereof. The weep holes may include a flap that permits fluid to pass in one direction but prevents fluid from passing in an opposing direction (e.g., acts as a check valve). The one or more weep holes may be a through hole, a perforation, a slit, a cut, a mechanical device that creates a channel, an area with material removed, or a combination thereof. The weep holes may be present when there are one or more folds, two or more folds, or even three or more folds. If drainage features are present, the flexible region, the folds, the attachment region, or a combination thereof may be free of weep holes. The one or more weep holes may work with one or more drainage features or may act independently of the one or more drainage features.

The one or more drainage features may function to allow water to exit from a photovoltaic array, a photovoltaic element, or both. The one or more drainage features may be located adjacent to one or more attachment regions, one or more flexible regions, or both. The one or more drainage features may be a through hole, a perforation, a slit, a cut, a mechanical device that creates a channel, an area with material removed, an area of thinned material, or a combination thereof. Preferably, the one or more drainage features are a channel in the shingle portion, the attachment region, under a fold, or a combination thereof that allows water to flow out from the photovoltaic array, the photovoltaic elements, or both. The one or more drainage features may be in a front surface, a rear surface, or both. The location of the one or more drainage features may be varied depending on whether the fold is a forward facing fold or a rearward facing fold. The one or more drainage features may be a thin spot in the material of the shingle portion so that water may flow therethrough. The one or more drainage features may extend in the direction of the slope of the roof structure, transverse to the direction of the slope of the roof structure, or an angle therebetween. The one or more drainage features may be a device that is connected to the shingle portion, the attachment region, the flexible regions, or a combination thereof that permits fluid to exit therethrough. The one or more drainage features may permit fluid to flow only in a single direction (e.g., may include a flap that acts like a check valve). The one or more drainage features may be located proximate to the roof structure. For example, the fluid may flow along the roof structure and out of the drainage features so that the roof structure may be free of direct contact with the roof structure for extended periods of time (e.g., 6 hours or more or 24 hours or more). The drainage features may permit air to flow therethrough to dry the roof structure in the event that fluid penetrates into the photovoltaic array. The drainage features may assist in creating one or more flexible regions in the shingle portion. The one or more drainage features may be a half shape. For example, the one or more drainage features may have a half circle cross-section, open channel, closed channel, tube, half square, half rectangle, or a combination thereof.

The flexible regions may be due to material characteristics or mechanical characteristics. The flexible regions may form a hinge, be mechanically weakened, include perforations, a thinning of material, a channel, one or more cuts, an absence of material that creates a weakened region, slits, drainage elements, be free of ribs, or a combination thereof. Preferably, the flexible regions allow for a portion of the flexible region, the attachment region, or both to be rotated in a hinge like manner to form one or more folds. The material characteristics of the shingle portion may be reduced in flexible regions so that the shingle portion flexes in a transverse region. The material characteristics may vary in a flexible region. The flexible regions may include an elastomer, may have elastomeric characteristics, or both. The flexible regions may be an integral part of the shingle portion (i.e., may be one unitary piece). The flexible regions may be a separate piece that is connected to the shingle portion. The flexible regions may extend below a front region, a front surface, an adjacent shingle portion, an adjacent photovoltaic element, or a combination thereof. The one or more flexible regions may be movable so that the flexible regions extend under the photovoltaic element itself and are not covered by another photovoltaic element. The teachings herein include a flexible region with a hinge (i.e., a foldable component) and teachings as to a foldable component are found in International Publication No. WO2015/009365 in FIGS. 9B, 10B, and 100 and corresponding text in paragraphs 0007, 0029, 0042-0043, 0054, and 0056 the teachings of which are incorporated by reference herein for all purposes and especially for the teachings relating to the foldable component. The one or more flexible regions may extend over an overlap region of an adjacent photovoltaic element, receive a portion of an adjacent photovoltaic element, connect directly to a roof structure, connect to one or more other adjacent flexible regions, or a combination thereof. The one or more flexible regions may be planar strips of material that extend a length, a width, or both of the shingle portion. The material of the flexible regions may include one or more pieces of attachment material that form an attachment region.

The attachment region may function to receive one or more fasteners that attach the photovoltaic element to a roof structure while allowing the photovoltaic element to be folded about the flexible region. The attachment region may be one or more pieces of attachment material. The attachment material may be sufficiently strong so that when fastened to the roof structure the attachment material holds the shingle portion to the roof structure or assists in holding the photovoltaic element on the roof structure. The attachment region may have a bottom surface that faces the roof structure and a front surface that faces a bottom surface of the photovoltaic element when the photovoltaic element is folded over the attachment region. The attachment region may have a downward facing fold where the front surface of the attachment region faces the roof structure and the rear surface of attachment material in the attachment region faces a rear surface of another layer of the attachment region or the rear surface of the photovoltaic element. The attachment region may be folded multiple times so that a bottom surface of an attachment region faces the roof structure, and the front surface faces a rear surface of an adjacent attachment region while the front surface of the adjacent attachment region faces a bottom surface of photovoltaic element of the shingle portion. When more than one layer of attachment region is present the attachment regions may be stacked one on top of the other with folds (e.g., part of a flexible region) connecting the layers of attachment regions together. The attachment region may be folded one or more times. The attachment region may be folded a plurality of times. The attachment material in the attachment regions may be folded to be generally "U" shaped, generally "S" shaped, or both. The attachment region may be part of the flexible region or may be connected to the shingle portion by a flexible region. The attachment material may be made of the same material as the shingle portion. The attachment region and the shingle portion may be one unitary piece. The attachment region may be connected to and extend from the shingle portion. The attachment region may be reinforced or include reinforcements. For example, the attachment region may include reinforcements for receiving fasteners. The attachment region may be made of the same material or a different material as the shingle portion.

The shingle portion, flexible region, attachment region, or a combination thereof may have a polymeric composition that may have low shrinkage, result in a uniform elastic modulus between a length and width, or a combination of both. The polymeric composition may be homogeneous and the flexible region may be formed by a mechanical structure (e.g., a hinge). The polymeric composition may be any polymeric composition that may be flowable, have high electrical insulating properties, fluid impermeable, high flexibility, low creep, low modulus, fire retardant, or a combination thereof. Some polymeric compositions that may be used with the photovoltaic element taught herein are an elastomer, thermoplastic, thermosetting polymer, or a combination thereof. The polymeric composition may include a filled or unfilled moldable plastic, polyolefins, acrylonitrile butadiene styrene (SAN), hydrogenated styrene butadiene rubbers, polyester amides, polysulfone, acetal, acrylic, polyvinyl chloride, nylon, polyethylene terephthalate, polycarbonate, thermoplastic and thermoset polyurethanes, polyethylene, polystyrene, synthetic and natural rubbers, epoxies, polystyrene, thermoplastic elastomer (TPO, TPE, TPR), polyamides, silicones, vinyl based resins, or any combination thereof. The polymeric composition may be free of fillers, fibers, reinforcing materials, or a combination thereof. The polymeric composition may include fillers such as colorants, fire retardant (FR) or ignition resistant (IR) materials, reinforcing materials, such as glass or mineral fibers, surface modifiers, nylon fibers, or a combination thereof. The polymeric composition may also include antioxidants, release agents, blowing agents, and other common plastic additives. Examples of suitable polymeric compositions are found in U.S. Patent Application Publication No. 2011/0100438 the contents of which are expressly incorporated by reference herein for the polymeric compositions. Examples of other roofing substrates that may be used as taught herein are found in U.S. Pat. No. 8,943,766 in Column 6, line 42 through Column 8, line 49 including U.S. Patent Application Nos. 2007/0266562; 2009/0000222; 2009/0133340; 2009/0133740; 2009/0178350; and 2009/0159118 the teachings of which are all expressly incorporated by reference herein for all purposes. The material of the shingle portion may be consistent throughout the entire shingle portion. The material as discussed herein may be varied in the one or more flexible regions of the shingle portion so that the flexible regions are foldable upon itself. Preferably, the shingle portion surrounds all or a portion of the photovoltaic assembly. More preferably, the shingle portion creates a periphery around the photovoltaic assembly. However, the photovoltaic assembly may rest directly on top of the shingle portion without the shingle portion surrounding all or a portion of the shingle portion.

The one or more and preferably the plurality of photovoltaic assemblies may be configured in any manner so that each of the plurality of photovoltaic elements may be electrically connected. The photovoltaic assemblies may include a protective cover (e.g., a glass cover or a barrier plastic cover) and at least one pv cell (e.g., an electrical circuit). Each of the individual photovoltaic elements (i.e., the photovoltaic assemblies in the photovoltaic elements) may be electrically connected to an adjacent photovoltaic element by one or more connectors. The one or more connectors may comprise a ribbon, a positive electrode, a negative electrode, a wire, or a combination thereof. The connector may extend between two adjacent photovoltaic elements and forms an electrical connection. The connectors may assist in securing the two or more adjacent photovoltaic elements to a support structure. Preferably, the connectors do not assist in connecting the photovoltaic elements to a support structure and the photovoltaic elements are connected to the roof structure by a fastener. The overlap region may be free of connectors. The connectors may be a separate piece, a discrete piece, or both that connects two or more adjacent photovoltaic elements. The connectors may extend from an active portion of the photovoltaic element, be part of a photovoltaic element, or both. The connectors may be an integral part of a photovoltaic assembly.

The photovoltaic assembly may be connected to a shingle portion, be integrated into a shingle portion, or both. The photovoltaic element includes an active portion (i.e., the portion that includes the photovoltaic assembly) and a support portion (i.e., a portion that supports the photovoltaic assembly). The active portion and the support portion may be the same region of the shingle portion. The active portion of the photovoltaic element (e.g., a front region or front surface of the photovoltaic element) may be any portion of the photovoltaic element that produces electricity when the active portion is in contact with sunlight. The photovoltaic assembly may be made of any material so that when sunlight is directed on the active portion, front region, front surface, or a combination thereof the sunlight is converted into electricity. The photovoltaic assembly may be made of one or more photovoltaic cells having a photoactive portion. Preferably, the photovoltaic assembly may be made of a plurality of photovoltaic cells. The photovoltaic cells may be made of any material that assists in converting sunlight into electricity. The photovoltaic cells may be of any type and material known in the art. Some non-limiting examples of materials that the photovoltaic cells may be made of include crystalline silicon, amorphous silicon, cadmium telluride (CdTe), gallium arsenide (GaAs), copper chalcogenide type cells (e.g. copper gallium selenides, copper indium gallium selenides (CIGS), copper indium selenides, copper indium gallium sulfides, copper indium sulfides (CIS), copper indium gallium selenide sulfides, etc. (i.e., known generally as CIGSS)), thin-film III-V cells, thin-film II-VI cells, IB-IIIA-chalcogenide (e.g., IB-IIIA-selenides, IB-IIIA-sulfides, or IB-IIIA-selenide sulfides), organic photovoltaics, nanoparticle photovoltaics, dye sensitized photovoltaic cells, and/or combinations of the described materials. In one specific example, the copper indium gallium selenides may be represented by the formula $CuIn(1-x)Ga_xSe(2-y)S_y$ where x is 0 to 1 and y is 0 to 2. For copper chalcogenide type cells, additional electroactive layers such as one or more of emitter (buffer) layers, conductive layers (e.g. transparent conductive layers) or the like maybe used in CIGSS based photovoltaic cells are contemplated by the teachings herein. The active portion may be flexible or rigid and come in a variety of shapes and sizes, but generally are fragile and subject to environmental degradation. In a preferred embodiment, the active portion is a cell that can bend without substantial cracking and/or without significant loss of functionality. Other materials and/or combinations are contemplated herein especially those compositions disclosed in paragraph 0054 of U.S. Patent Application Publication No. 2012/0118349, which is incorporated herein by reference as to materials for the active portion. In addition to the teachings herein the photovoltaic assembly may be made of or include any of the teachings of U.S. Pat. No. 8,943,766 Column 4, lines 19 to Column 6, line 8 including the teachings and methods included in U.S. Patent Application Publication No. 2008/0006323; 2008/0271773; 2009/0000221; 2009/0133738; 2009/0133739; and 2010/0282318 all of which are expressly incorporated by reference herein in their entirety. The photovoltaic cells of the photovoltaic assembly may be arranged in parallel, series, mixed series-parallel, and/or may be provided in independent circuits. The photovoltaic assembly may be a combination of layers and may form an assembly.

The photovoltaic assembly may include one or more of the following components: a forward protective layer, a rearward protective layer, a reinforcement, a photovoltaic cell, a peripheral moisture sensitive edge seal, one or more internal protecting layers, dielectric materials as may be needed to manage the penetration of electrical components outside the assembly, attached connectors and wiring boxes, connector support structures including junction boxes, integrated low profile connectors, encapsulants, moisture resistant back sheets that may optionally include metallized sub layers, or a combination thereof. One example of a photovoltaic assembly may include a top layer of glass or a polymeric moisture barrier, an encapsulant layer, an electrical assembly comprising cells, bypass diodes and busses, a rear encapsulant layer, an aluminum based multi-layer back sheet, another encapsulant layer, a rearward protective layer, additional layers around the connector area including a connector support structure, an encapsulant, a dielectric layer, a connector sealant material such as an adhesive with a moisture barrier or another adhesive sealant or potting material, the low profile connector attached to the cells with bus terminals, another layer of encapsulant, and another dielectric layer. The rearward protective layer may help protect the assembly from any protrusions or abrasion from the support structure of the base plate. The rearward protective layer may extend beyond the other elements of the photovoltaic assembly, the shingle portion, or both to form the flexible region. The photovoltaic assembly may be free of an encapsulant layer, a rearward protective layer, or both. One or more of the layers discussed herein may be a combination of layers. For example, a forward protective layer may be a combination of multiple glass layers combined together. As another example, the reinforcement may be a plurality of layers bonded together. The layers of photovoltaic assembly may be laminated together. The layers of the photovoltaic assembly may be sealed at the edges. Preferably, the photovoltaic assembly has a peripheral sealed edge that is resistant to fluid penetration. As discussed herein, each individual layer may include an adhesive so that one or more layers are bonded together forming a layer, each layer may include an adhesive over and/or under another layer so that the one or more adjacent layers are bonded together. Other components and layers of the photovoltaic element are contemplated herein that may be used with the reinforcement taught herein especially those components, layers, and/or materials disclosed in Paragraph Nos. 0048-0053 of U.S. Patent Application Publication No. 2012/0118349, and Paragraph Nos. 0027-0038 and FIGS. 2A and 2B 2011/0220183, both of which are expressly incorporated herein by reference as to components, layers, and/or materials for active portions that may be used in conjunction with the reinforcement and photovoltaic element discussed herein. One or more of the layers of the photovoltaic assembly may be electrical circuitry. The electrical circuitry may be sealed within the photovoltaic assembly.

The electrical circuitry of the photovoltaic assembly may be one or more electrodes, one or more ribbons, or both. The electrical circuitry may extend from cell to cell, photovoltaic element to photovoltaic element, cell to a photovoltaic element, active portion to active portion, or a combination thereof. The electrical circuitry may be integrated into the one or more photovoltaic cells, connect the one or more photovoltaic cells, be electrically connected to the one or more photovoltaic cells, extend through a shingle portion, extend over a shingle portion, extend under a shingle portion, or a combination thereof. The electrical circuitry may be integrated into and/or around one or more layers of the photovoltaic assembly. The electrical circuitry may extend through the photovoltaic assembly, extend partially outside of the photovoltaic assembly so that an electrical connection may be formed, have a portion that is located adjacent to the photovoltaic assembly, or a combination thereof. The photovoltaic assembly may be connected to a support portion of a shingle portion forming an adjacent portion. The photovoltaic assembly may include one or more connectors that are part of the electrical circuitry and extend outside of the photovoltaic assembly. The one or more connectors may have a portion that is sealed within the photovoltaic assembly and a portion that extends out of the photovoltaic assembly.

The one or more photovoltaic elements, shingle portions, attachment regions, or a combination thereof may be connected to the roof structure by one or more fasteners. The one or more fasteners may be one or more nails, screws, clips, bolts, rivets, the like, or a combination thereof that function to connect the photovoltaic element to the roof structure.

Figure 1:
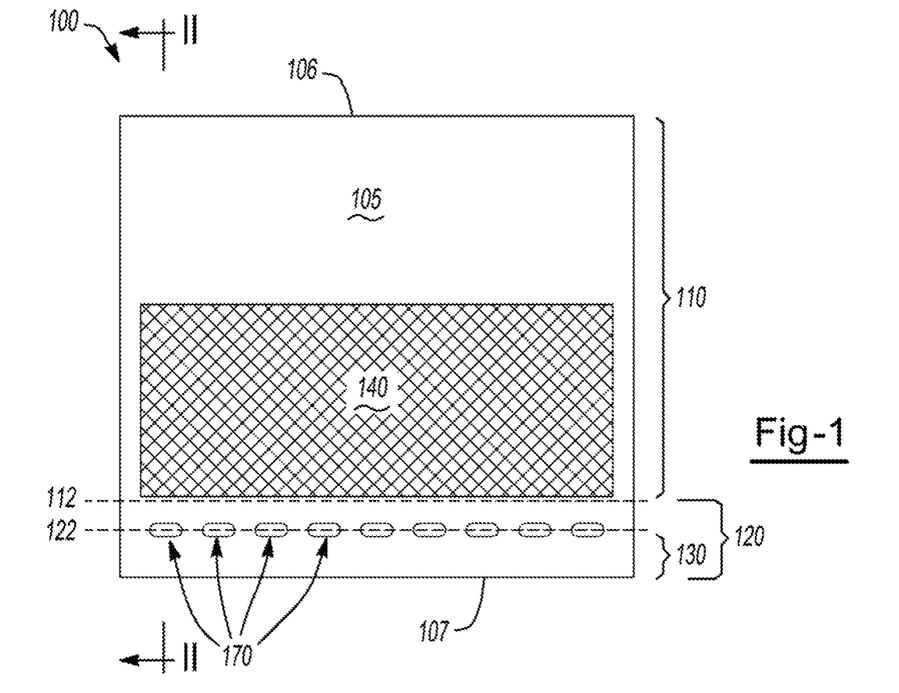
FIG. 1 illustrates a top view of a photovoltaic element including weep holes.

FIG. 1 illustrates a top view of a photovoltaic element 100. The photovoltaic element 100 has a shingle portion 105 and a photovoltaic assembly 140. A portion of the shingle portion 105 proximate to the top end 106 and the photovoltaic assembly 140 are in a front region 110 that faces the sun to generate power. A portion of the shingle portion 105 proximate to the bottom end 107 of the photovoltaic element 100 includes a flexible region 120 and attachment region 130 that is part of the flexible region 120. The attachment region 130 is folded so that the attachment region 130 of the flexible region 120 is folded under the remaining portion of the flexible region 120. The flexible region 120 extends from the bottom end 112 of the photovoltaic assembly 120, and the weep holes 170 extend along a fold line 122 of the flexible region to permit fluid to exit the shingle portion through the fold.

Figure 2:
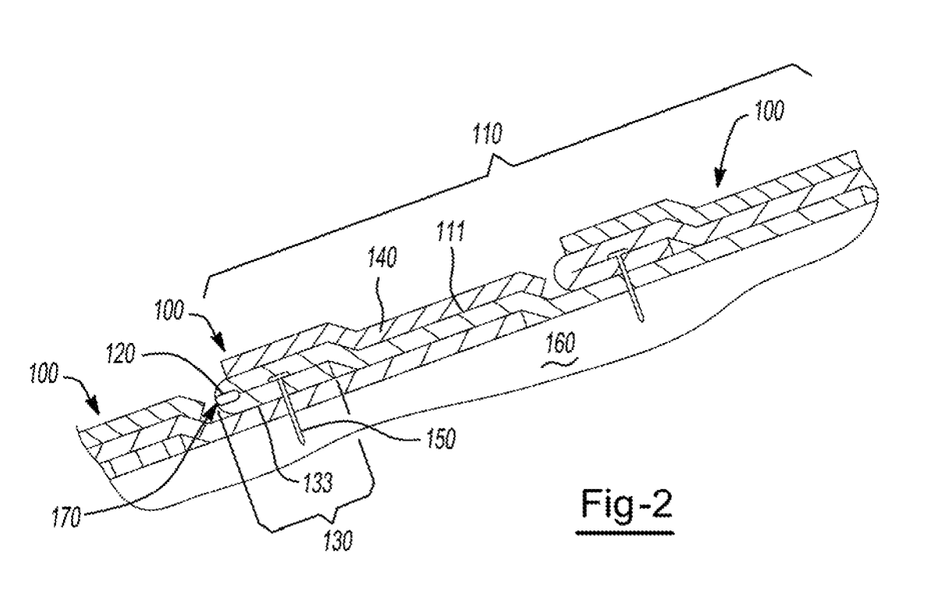
FIG. 2 illustrates a side view of overlapped photovoltaic elements and a weep hole extending through a flexible region.

FIG. 2 illustrates photovoltaic elements 100 connected to a roofing structure 160. The photovoltaic elements 100 are shown in a partial cross-sectional view, the center of the photovoltaic elements 100 being the photovoltaic element 100 of FIG. 1, when the photovoltaic element 100 is folded and cut along line II-II. The photovoltaic element 100 in the center is partially covered by an upper photovoltaic element 100 and partially covers a lower photovoltaic element 100. The center photovoltaic element 100 has a front region 110 that faces upward. The photovoltaic assembly 140 is the upper most part and is located on a front surface 111 of the shingle portion. The attachment region 130 is folded under the unfolded portion of the flexible region 120 so that a fold surface 133 of the attachment region 130 contacts a front region of an adjacent photovoltaic element (i.e., is a downward facing fold). A fastener 150 extends through the attachment region 130, the front region 110 of the adjacent photovoltaic element, and the roof surface 160 so that the attachment region 130 and the roof surface 160 are connected together. The weep holes 170 are a through hole that extends through the fold line 122 of the flexible region 120 to permit fluid to exit out of the photovoltaic array.

Figure 3:
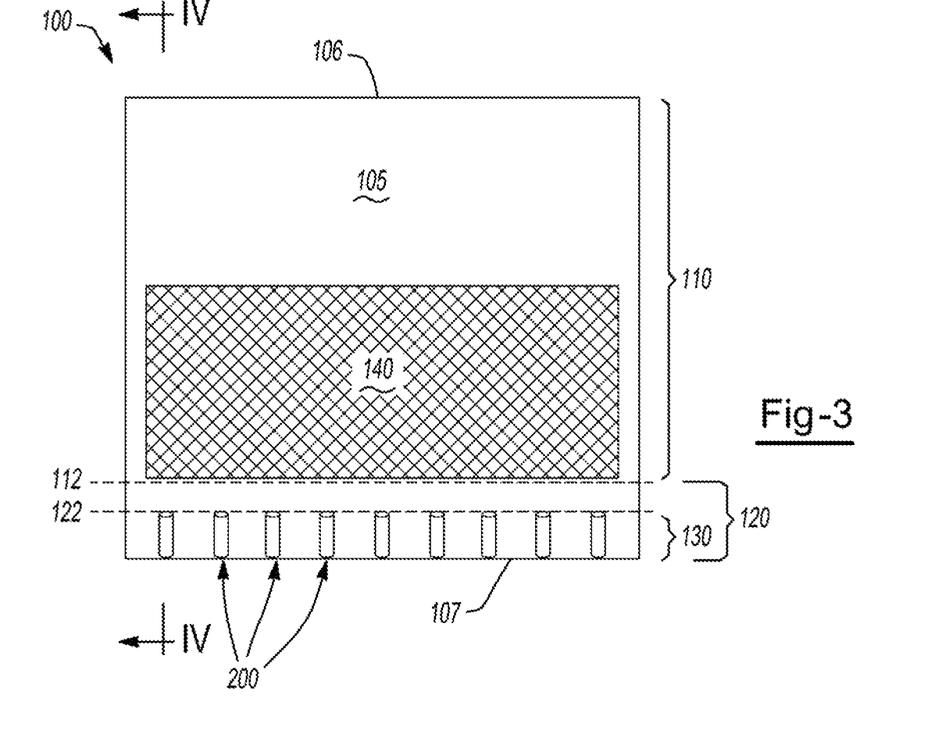
FIG. 3 illustrates a top view of a photovoltaic element including drainage features.

FIG. 3 illustrates a top view of a photovoltaic element 100 having top end 106, a bottom end 107, and a front region 110. The photovoltaic element 100 includes a shingle portion 105 and a photovoltaic assembly 140. The photovoltaic assembly 140 includes a bottom end 112 that is adjacent to a flexible region 120 (as shown is a transverse flexible region). The flexible region 120 includes an attachment region 130, which begins at a fold line 122 and as shown extends to the bottom end 107. The attachment region 130 includes a plurality of drainage features 200. The attachment region 130 is folded under the flexible region 120 at the fold line 122 of the flexible region 120. The drainage features 200 extend along the slope of the roof structure 160 so that water extends down therethrough.

Figure 4:
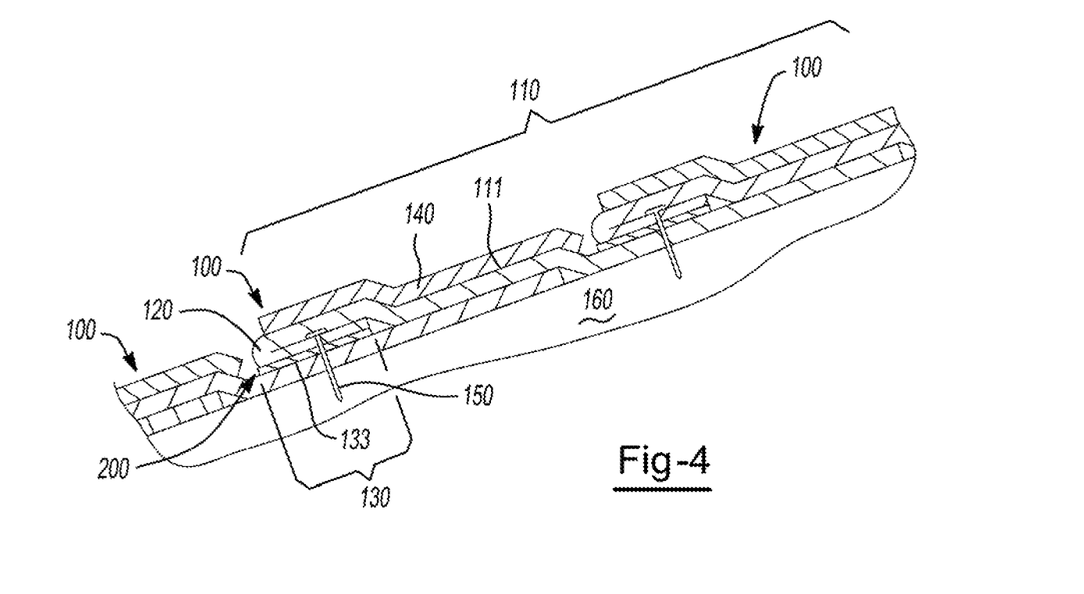
FIG. 4 illustrates a side view of overlapped photovoltaic elements including drainage features in the flexible region.

FIG. 4 illustrates a partial cross-sectional view of a folded photovoltaic elements 100 of FIG. 3 cut along line IV-IV, which is connected to a roof structure 160 and located between two other photovoltaic elements 100. The photovoltaic element 100 in the center is partially covered by an upper photovoltaic element 100 and partially covers a lower photovoltaic element 100. The center photovoltaic element 100 has a front region 110 that faces upward. The photovoltaic assembly 140 is the upper most part and is located on a front surface 111 of the shingle portion 105. The attachment region 130 of the flexible region 120 is folded under the shingle portion 105 so that a fold surface 133 contacts a front region 110 of an adjacent (i.e., lower) photovoltaic element 100 (i.e., forming a downward facing fold). A fastener 150 extends through the attachment region 130 and the roof surface 160 so that the attachment region and the roof surface 160 are connected together. The drainage features 200 extends along a fold surface 133 of the attachment region 130 to permit fluid to exit out of the photovoltaic array.

Figure 5:
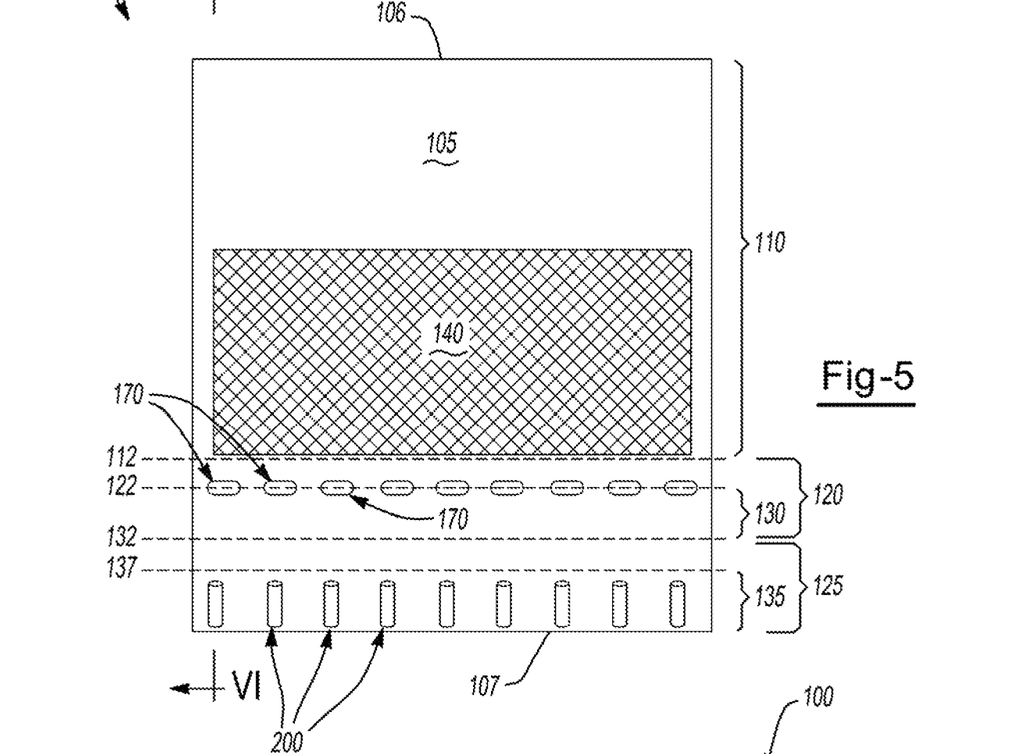
FIG. 5 is a top view of a photovoltaic element including both weep holes and drainage features.

FIG. 5 illustrates a top view of a photovoltaic element 100 having top end 106, a bottom end 107, and a front region 110. The photovoltaic element 100 includes a shingle portion 105 and a photovoltaic assembly 140. The photovoltaic assembly 140 includes a bottom end 112 that is adjacent to a flexible region 120 (as shown is a transverse flexible region). The flexible region 120 includes an attachment region 130 that includes a plurality of weep holes 170. The weep holes 170 extend through a fold line 122 of the flexible region 120 where the flexible region is folded to form the attachment region 130. The attachment region 130 abuts an adjacent flexible region 125 at a bottom end 132 of the attachment region 130. An adjacent attachment region 135 includes an adjacent attachment material that extends from an adjacent fold line 137 of the adjacent flexible region. The adjacent attachment region 135 includes a plurality of drainage features 200 that as shown are located on the front region 110.

Figure 6:
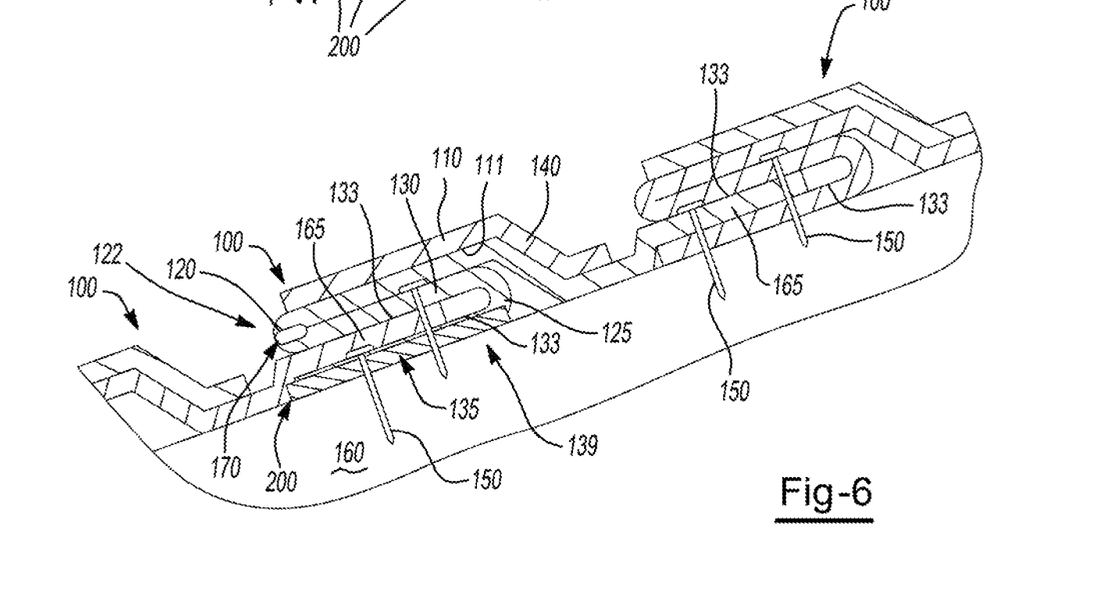
FIG. 6 is a side view of overlapped photovoltaic elements including both weep holes and drainage features in a flexible region.

FIG. 6 illustrates a partial cross-sectional view of a center photovoltaic element 100 of FIG. 5 cut along line VI-VI and connected to a roof structure 160. The photovoltaic element 100 in the center is partially covered by an upper photovoltaic element 100 and partially covers a lower photovoltaic element 100. The center photovoltaic element 100 receives an insert portion 165 of the lower photovoltaic element 100 and contacts the lower photovoltaic element 100 by sandwiching a portion of the lower photovoltaic element 100 between fold surfaces 133 of the attachment material 130 and the adjacent attachment material 135. Similarity, the upper photovoltaic element 100 receives the insert portion 165 of the center photovoltaic element 100 between the fold surfaces 133. A fastener 150 extends through the adjacent attachment region 135 of the adjacent flexible region 125 and the fold surfaces 133 as is shown on the right side of FIG. 6. The center photovoltaic element 100 has a front region 110 that faces upward. The photovoltaic assembly 140 is the upper most part and is located on a front surface 111 of the shingle portion 105. The attachment region 130 is folded under the shingle portion 105 forming an upward facing fold. Weep holes 170 extend through the fold line 122 of flexible region 120 proximate to the attachment region 130. The adjacent flexible region 125 is folded about an edge of the shingle portion 105 so that the adjacent flexible region 125 extends from a top of the shingle portion 105 to a bottom of the shingle portion 105. An adjacent flexible region 125 extends from the flexible region 120 and the adjacent flexible region 125 folds under the fold surface 133 of the flexible region 120 and around an insert portion 165 of an adjacent photovoltaic element 100. The adjacent attachment region 135 includes a plurality of drainage features 200 that extend in the direction of the slope of roof on a side of the adjacent flexible region 125 facing the roof structure 160.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

We claim:

1. A photovoltaic module comprising: a shingle portion including:
   a top end; a bottom end; and
   one or more weep holes extending along the bottom end;
   a photovoltaic cell connected to the shingle portion above the one or more weep holes; and
   one or more channels extending at least partially beneath the photovoltaic cell and the one or more weep holes, the one or more channels being fluidly connected to the one or more weep holes;
   wherein the one or more weep holes of the shingle portion and the one or more channels allow fluid to drain from the photovoltaic module beneath the photovoltaic cell.

2. The photovoltaic module of claim 1, wherein:
   the shingle portion comprises an outermost edge when secured to a roof structure; and the one or more weep holes allow fluid to drain through the outermost edge.

3. The photovoltaic module of claim 1, wherein the one or channels beneath the photovoltaic cell extend in a direction from the top end to the bottom end of the shingle such that when the shingle is secured to a roof structure the one or more channels extend in a direction of a slope of the roof structure.

4. The photovoltaic module of claim 1, wherein the photovoltaic cell is connected to the shingle portion proximate to the bottom end.

5. The photovoltaic module of claim 4, wherein a bottom end of the photovoltaic cell is positioned at the bottom end of the shingle portion.

6. The photovoltaic module of claim 1, wherein the shingle portion further comprises:
   an overlap region adjacent to the top end of the shingle portion; and an attachment region adjacent to the bottom end of the shingle portion.

7. The photovoltaic module of claim 6, wherein the photovoltaic cell is connected to the attachment region of the shingle portion.

8. A photovoltaic array comprising first and second photovoltaic modules according to claim 7, wherein:
   the attachment region of the first photovoltaic module at least partially covers the overlap region of the second photovoltaic module; and the attachment region of the first photovoltaic module is attached to the overlap region of the second photovoltaic module.

9. The photovoltaic array of claim 8, wherein one or more fasteners extend through the attachment region of the first photovoltaic module and the overlap region of the second photovoltaic module to attach the first and second photovoltaic modules to a roof surface.

* * * * *